Figure 1:
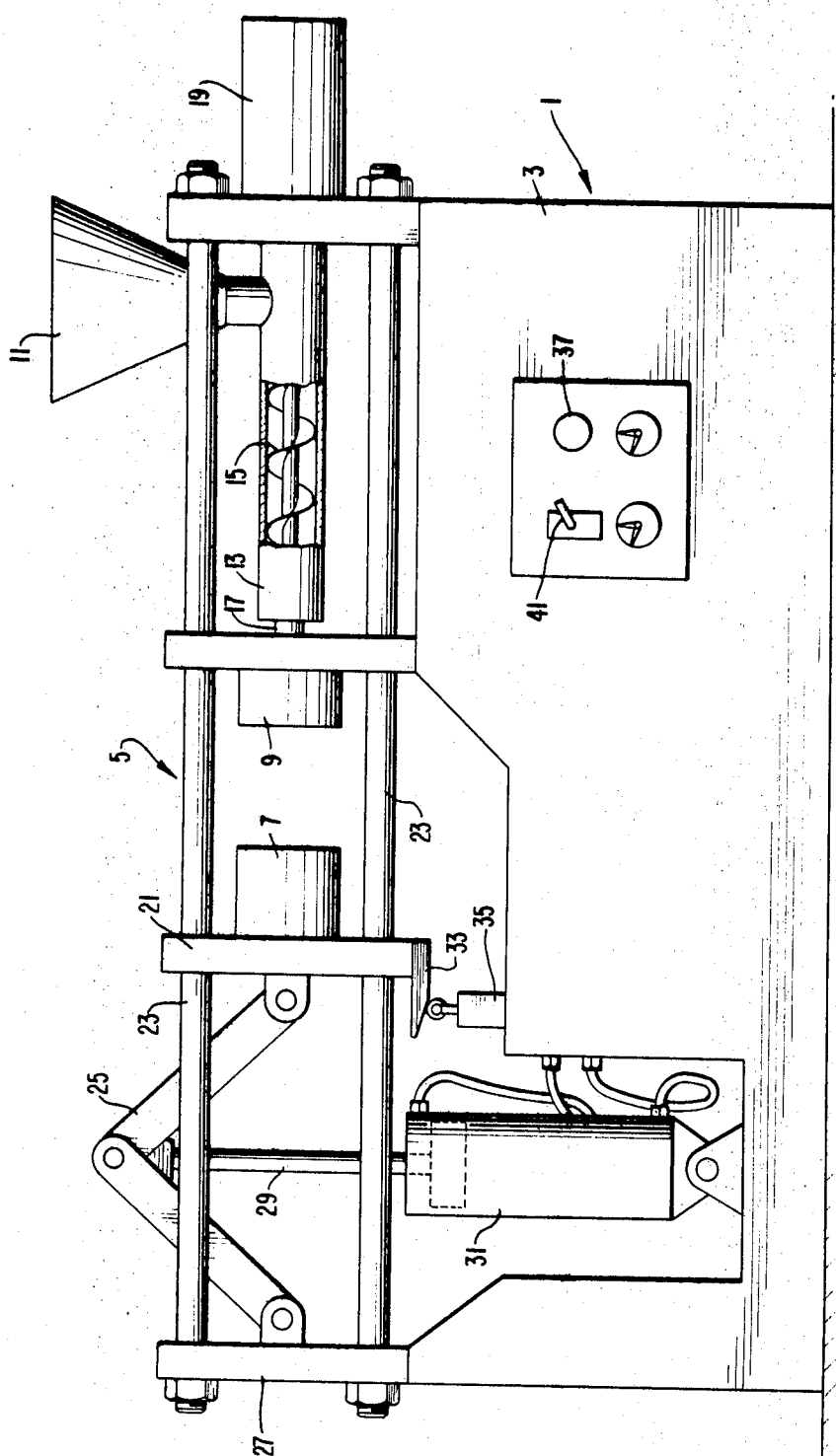

United States Patent

[11] 3,574,896

| [72] | Inventor | Helmut Fernholz<br>Wiensenstrasse 2, Meinerzhagen Westfalen, Germany |
|---|---|---|
| [21] | Appl. No. | 729,596 |
| [22] | Filed | May 16, 1968 |
| [45] | Patented | Apr. 13, 1971 |

[54] MOLDING APPARATUS
3 Claims, 2 Drawing Figs.

[52] U.S. Cl. ................................................. 18/30,
18/2, 18/16
[51] Int. Cl. ................................................. B29f 1/00
[50] Field of Search ........................................... 18/30 (CS),
(Safety Digest), 16 (C), 30 (CK), 2 (I)

[56] References Cited
UNITED STATES PATENTS

| 2,923,972 | 2/1960 | Ninneman | 18/30CSX |
| 3,078,515 | 2/1963 | Wintriss | 18/30CSX |
| 3,242,533 | 3/1966 | Wintriss | 18/30CS |
| 3,310,841 | 3/1967 | Hehl | 18/Safety Digest |

*Primary Examiner*—J. Spencer Overholser
*Assistant Examiner*—Michael O. Sutton
*Attorney*—Young & Thompson

ABSTRACT: Molding apparatus that operates cyclically and has an operating period and a rest period during each cycle is provided with a pair of timers that are alternately actuated upon movement of a portion of the apparatus through a reciprocatory path of motion once during one full cycle. One timer thus runs during the operating period and the other during the rest period; and if either should time out, thereby indicating a malfunction of the apparatus, then the actuating and heating circuits are opened and an alarm is actuated.

INVENTOR
HELMUT FERNHOLZ

Patented April 13, 1971

3,574,896

2 Sheets-Sheet 2

INVENTOR
HELMUT FERNHOLZ

BY Young & Thompson

ATTORNEYS

MOLDING APPARATUS

The present invention relates to molding apparatus, more particularly of the plastic molding type useful for the performance of injection-molding or -pressing or blow-molding operations. The invention will be described and illustrated in connection with an injection-molding apparatus, but it is to be understood that it is usable in a variety of molding operations.

In the operation of molding apparatus such as those having separable mold sections at least one of which is reciprocably moved between open and closed positions, each full cycle of operation is divided into two portions: (1) a production period during which the mold is closed and the molding material is injected into the mold and cured or not, whereafter the mold is opened for ejection or other expulsion of the molded article; and (2) a rest period during which the open mold cools preparatory to receiving another charge of molding material. In known apparatus of this type, the actuation and timing of the various movements of the apparatus is under the control of timers, so that each movement or each stage of the operations during the cycle is performed at a predetermined point in the cycle and, dependent on the nature of the operation, continues for a predetermined period of time.

However, it sometimes happens that the apparatus malfunctions in some way so that its operation is incorrect and unsuitable for the continuous production of molded articles. For example, the mold may not close all the way, or an article may not properly eject and may become jammed in some moving part of the apparatus, or the heat for plasticizing the plastic may fail and the mold-filling operation may be thus delayed or prevented; or indeed, any of a variety of other malfunctions may occur. In the past, it has been a common practice to station a workman at the machine, to monitor visually the operation of the apparatus and to detect any such malfunctions. Of course, this practice greatly increases the cost of operation.

It has also been proposed to provide an electrical cycle timer, thereby automatically to monitor the cycle by detecting any prolongation of the cycle time from the cycle time which obtains during normal operation of the apparatus. In other words, it has been proposed to provide a timer which would give an alarm if the cycle time is unduly prolonged, thereby to signal malfunction of the machine. However, such cycle timers are unsatisfactory for several reasons. In the first place, they can be deceived by the machine: for example, the apparatus may arrive repeatedly at a control position with respect to the timer, or remain in that control position, without going through any substantial portion of the cycle; and this condition is not detected by the timer responsive to cycle time. As another example, one portion of the cycle may borrow from another portion, so that there is no rest portion of the cycle, for example, or for example so that there is no operating portion of the cycle.

The present invention overcomes these difficulties of monitoring proper operation and signalling improper operation, by providing two timers which operate in alternation: the one timer is associated with the operating period and the other timer is associated with the rest period. The total period during which both timers are actuated once, one after the other, is the cycle time. Thus, if there is an undue prolongation either of the operating period or of the rest period, the apparatus will be inactivated and an alarm will be given immediately. There will be no condition of malfunction that produces any substantial variation of the length of any portion of the cycle, which will not be thus detected.

Accordingly, it is an object of the present invention to provide a molding apparatus whose correct function is automatically monitored.

Another object of the present invention is the provision of molding apparatus of greatly improved ability to detect its own malfunction.

Finally, it is an object of the present invention to provide molding apparatus and controls therefore, which will be relatively simple and inexpensive to construct, install, maintain, operate and repair.

Figure 2:
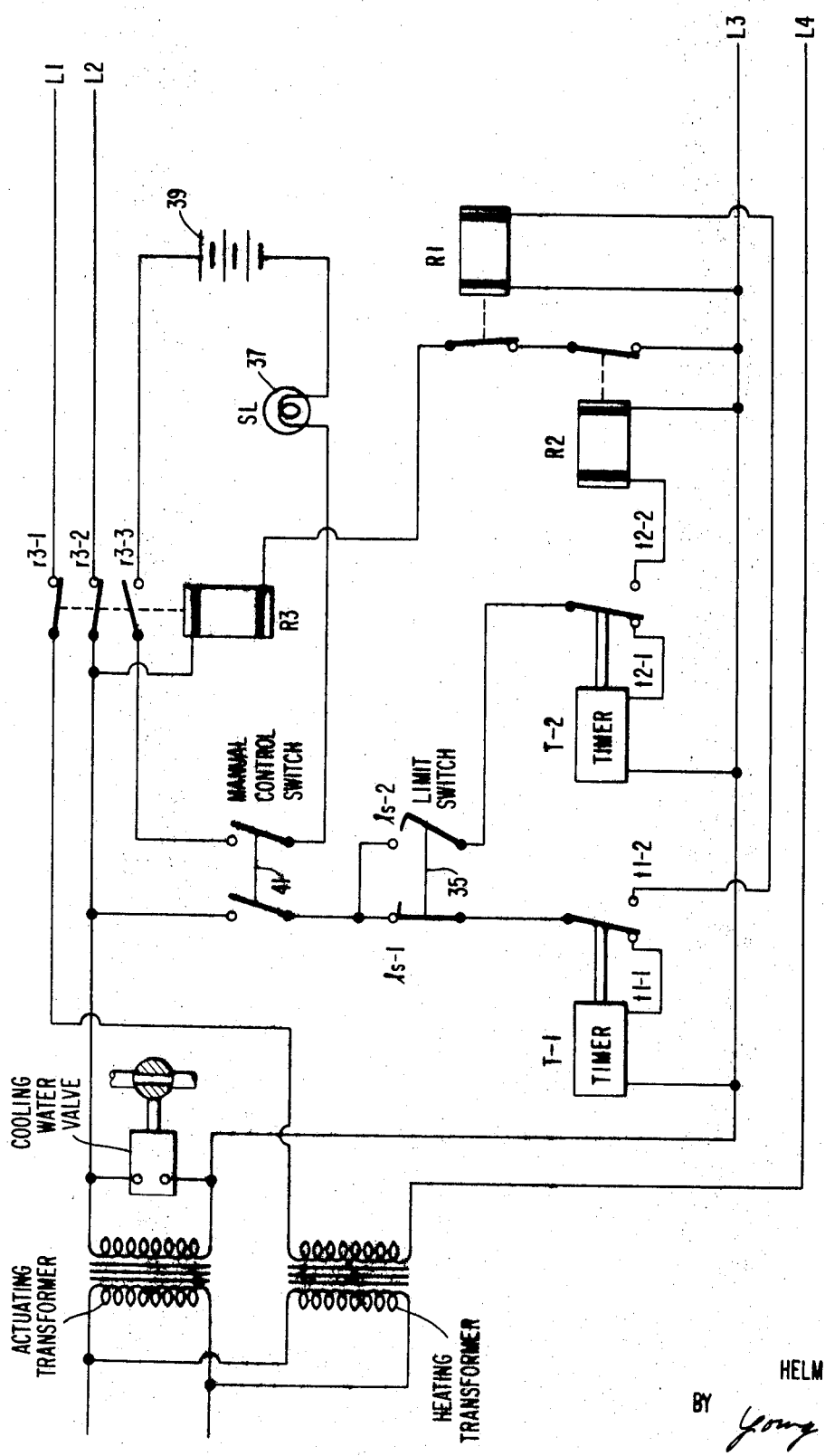

Other objects and advantages of the present invention will become apparent from a consideration of the following description, taken in connection with the accompanying drawings, in which:

FIG. 1 is a somewhat schematic view of molding apparatus according to the present invention; and FIG. 2 is a partial circuit diagram of the molding apparatus controls according to the present invention.

Referring now to the drawings in greater detail, there is shown in FIG. 1 molding apparatus indicated generally at 1, of the injection-molding type, comprising a base 3 on which is supported a mold generally indicated at 5 and comprising a pair of mold halves 7 and 9 of conventional construction. The apparatus of FIG. 1 is of the injection-molding type, in which the mold halves 7 and 9 are moved toward each other to close the mold and moved apart to open the mold to permit ejection or other discharge of a finished molded workpiece. When closed, molding material from a hopper 11 is fed through a heated casing 13 by means of a screw conveyor 15 through an injection nozzle 17 and into the closed mold. Screw conveyor 15 is driven by an electric motor 19.

Means are provided for opening and closing the mold by moving mold half 7 toward and away from mold half 9, comprising a support 21 by which mold half 7 is carried and which in turn slides horizontally on a plurality of guide rods 23. A toggle linkage 25 is secured at one end to support 21 and at the other end to an upright 27 on base 3, and the elbow of the linkage 25 is pivotally secured to the outer end of a piston rod 29 whose piston slides reciprocably in a hydraulic cylinder 31 pivotally mounted on base 3. Means are provided for supplying hydraulic fluid under pressure selectively to opposite ends of cylinder 31 by conventional hydraulic supply means (not shown), thereby to move piston rod 29 and collapse or extend the toggle linkage 25, so as to open or close mold 5.

Also, conventional heating coils or strips are incorporated in the casing 13 and/or one or both of the mold halves; and conventional cooling water circuits are provided; but these are omitted from the drawings for the sake of simplicity and to avoid the introduction of a mass of confusing lines.

Thus, the structure of the invention as so far described is quite conventional and is disclosed in greater detail in any number of earlier patents such as U.S. Pat. No. 3,278,992.

In operation, the fluid motor 29, 31 is actuated to draw piston rod 29 downwardly and to extend linkage 25, thereby to close the mold halves together. Thereafter, motor 19 is actuated to screw conveyor 15 to force molding material into the closed mold; and after a period of heating or cooling of the molding material in the mold, depending on whether the molding material is a thermosetting resin or a thermoplastic resin, the fluid motor is operated in the opposite direction to open the mold halves whereupon the article is ejected or falls by gravity from the mold. The parts then remain in the position of FIG. 1 during the rest period for cooling preparatory to the next molding operation.

The present invention differs from previous molding apparatus by the controls which are principally shown in FIG. 2 and whose general location in the apparatus is indicated in FIG. 1. Broadly, a portion of the apparatus is selected as the control portion, which undergoes one full reciprocation during each full cycle of operation and whose movements occur at the junctures of the two portions of the cycle, namely, the rest portion and the operating portion. In the illustrated embodiment, the control portion is selected as the structure which reciprocates with mold half 7; and accordingly, a cam 33 is carried by support 21, which engages with a limit switch 35 in the open mold position, that is, during the rest portion of the cycle. Limit switch 35 is of the two-position type, having two sets of contacts one of which is closed while the other is open. Limit switch 35 is also of the type that has no middle position in which none of its contacts is closed. Thus, one circuit or another will always be adapted to be completed through limit switch 35, because the time during which one set of contacts of the limit switch is closed slightly overlaps the time during which the other set of contacts is closed.

The function of limit switch 35 will best be understood from the circuit diagram of FIG. 2, in which the actuating circuit that opens and closes the mold and feeds the molding material and operates any workpiece ejector is shown at L2, L3; while the heating circuit for the molding material in casing 13 and/or mold 5 is shown at L1, L4. The devices actuated by circuit L2, L3 and the elements heated by circuit L1, L4 are omitted from FIG. 2, as they are quite conventional.

Limit switch 35 is thus seen to be in the circuit of L2, L3 to control the actuation of two timers T1 and T2. The normal position of each timer T1 and T2 is with its contacts $t1-1$ and $t2-1$ closed. When each timer times out, however, its contacts $t1-1$ or $t2-1$ open and its contacts $t1-1$ and $t2-2$ close.

A relay R1 is in circuit with the contacts $t1-2$ of timer T1; while a relay R2 is in circuit with the contacts $t2-2$ of timer T2. Either one of relays R1 and R2 opens the circuit of a relay R3, shown in FIG. 2 in its energized condition, in which its contacts $r3-1$ and $r3-2$ are closed and its contacts $r3-3$ are open. The contacts $r3-1$ are in the heating circuit L1, L4; while the contacts $r3-2$ are in the actuating circuit L2, L3. Upon opening of these two sets of contacts, therefore, both the heating circuit and the actuating circuit are opened and the operation of the device is interrupted.

Contacts $r3-3$ are in circuit with a signal light 37 powered by a battery 39. Thus, when relay R3 is tripped and contacts $r3-3$ close, signal light 37 can be lit.

A manual control switch 41 is in circuit with limit switch 35 and timers T1 and T2, and switch 41 also has contacts in the circuit of signal light 37. Thus, timers T1 and T2 and signal light 37 cannot be actuated until manual control switch 41 is closed.

In operation, the machine will operate under its usual controls (not shown) by which the mold is opened and closed and material fed to the mold, and so on as recited above. Upon mold-opening and -closing movement, namely, upon reciprocation of support 21, the cam 33 will alternately engage with and disengage from limit switch 35, being engaged with the limit switch throughout the rest period of the apparatus and being disengaged from the limit switch 35 during the operating portion of the cycle. Limit switch 35 will thus have one or the other of the possible positions indicated in FIG. 2.

Let it be assumed that the position of limit switch 35 in FIG. 1 is the same as shown in FIG. 2. Thus, when the mold opens and the mold half 7 moves to the FIG. 1 position during the rest portion of the cycle, the cam 33 closes the contacts $ls-1$ of limit switch 35 and timer T1 is energized. Timers T1 and T2 may for example be of the type disclosed in U.S. Pat. No. 2,675,583, which maintain their FIG. 2 position for a set period of time, and then time out, or switch. Thus, in the FIG. 2 position, timer T1 is running; and if it times out, then the contacts $t1-1$ will be open and the contacts $t1-2$ will be closed and relay R1 will open the circuit of relay R3, which in turn will open contacts $r3-1$ and $r3-2$ and close contacts $r3-3$, in order respectively to open the heating circuit and the actuating circuit and close the signal light circuit.

But during normal operation, when the rest portion of the cycle is not unduly prolonged, can 33 will move forward upon closing of the mold and limit switch 35 will move to its position other than that shown in FIG. 2, that is, its position in which contacts $ls-1$ are open and $ls-2$ are closed.

It is particularly to be noted that $ls-1$ is still closed when $ls-2$ just closes, so that there is no hiatus between the actuation of the timers T1 and T2; and there is accordingly no position of cam 33 and hence no position of the molding apparatus in which no timer is actuated.

With $ls-1$ open and $ls-2$ closed, timer T2 is actuated, and runs toward time out but is ordinarily prevented from timing out by the return movement of cam 33, which then moves limit switch 35 back to its FIG. 2 position, and so on, with timers T1 and T2 alternately actuated.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modification and variations are considered to be within the purview and scope of the present invention as defined by the appended claims.

I claim:

1. Molding apparatus for working plastic materials, comprising mold means for plastic materials, means for supplying plastic molding material to said mold means, means for opening and closing said mold means, means for actuating said opening and closing means and said supply means comprising at least one actuating circuit, said actuating means operating according to a timed cycle consisting of an operating portion and a rest portion, a pair of timers settable to predetermined periods of time, means for alternately actuating said timers according to whether the apparatus is in its operating portion or in its rest portion of said cycle, and means responsive to either of said timers when actuated for a period substantially longer than its predetermined period for opening said actuating circuit, said apparatus including a member that executes a reciprocatory movement once during each said cycle back and forth between a position which said member occupies during said rest portion of said cycle and a position which said member occupies during said operating portion of said cycle, said actuating means comprising a limit switch, and a switch actuator carried by said member for moving said limit switch into one position and for releasing said limit switch to move into another position, said limit switch in said one position actuating one said timer and in said another position actuating the other said timer.

2. Apparatus as claimed in claim 1, and a heating circuit in addition to said actuating circuit, said responsive means also opening said heating circuit.

3. Apparatus as claimed in claim 2, and an alarm, and means for actuating said alarm upon opening of said heating and actuating circuits.